(12) United States Patent
Iwashita et al.

(10) Patent No.: US 12,511,293 B2
(45) Date of Patent: Dec. 30, 2025

(54) COMPUTER-READABLE RECORDING MEDIUM STORING INFORMATION PROCESSING PROGRAM, INFORMATION PROCESSING DEVICE, AND INFORMATION PROCESSING METHOD

(71) Applicant: Fujitsu Limited, Kawasaki (JP)

(72) Inventors: Hiroaki Iwashita, Tama (JP); Tatsuya Asai, Kawasaki (JP); Kento Uemura, Kawasaki (JP); Yusuke Koyanagi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/769,473

(22) Filed: Jul. 11, 2024

(65) Prior Publication Data
US 2024/0362227 A1 Oct. 31, 2024

Related U.S. Application Data

(63) Continuation of application No. PCT/JP2022/005497, filed on Feb. 10, 2022.

(51) Int. Cl.
G06F 7/00 (2006.01)
G06F 16/2455 (2019.01)

(52) U.S. Cl.
CPC .............. *G06F 16/24558* (2019.01)

(58) Field of Classification Search
CPC .............................. G06F 16/24558
USPC .................................. 707/600–899
See application file for complete search history.

(56) References Cited

U.S. PATENT DOCUMENTS 11,748,656 B1 * 9/2023 Bose ................. G06N 5/01
706/12
2003/0074142 A1   4/2003 Steeg
2019/0384800 A1  12/2019 Elassaad

FOREIGN PATENT DOCUMENTS

JP       2001-265596      9/2001

OTHER PUBLICATIONS

Koyanagi et al., "Developing a Framework for Individual Causal Discovery and its Application to Real Marketing Data", JSAI Special Interest Group on Business Informatics (SIG-BI #18), Mar. 5, 2021. Cited in ISR.

(Continued)

*Primary Examiner* — Isaac M Woo
(74) *Attorney, Agent, or Firm* — Fujitsu Intellectual Property Center

(57) ABSTRACT

A non-transitory computer-readable recording medium stores an information processing program for causing a computer to execute processing including: generating, from first data in which values of a plurality of attributes included in each sample are accumulated for each sample, second data obtained by binarizing, for each sample, the values of the plurality of attributes included in each sample based on an attribute condition set in advance; enumerating, by using the second data, sets of attribute conditions in which all sample sets indicate true values; computing, for each set of attribute conditions, a correlation between the plurality of attributes in the first data in a sample set associated with each set of attribute conditions; and selecting a set of attribute conditions determined to have a correlation as a condition to be causally searched.

5 Claims, 13 Drawing Sheets

(56) References Cited

OTHER PUBLICATIONS

WIPO—International Search Report with English language translation and Written Opinion mailed on Apr. 26, 2022 for International Application No. PCT/JP2022/005497.
Uno et al., "An Efficient Algorithm for Enumerating Closed Patterns in Transaction Databases", Discovery Science 2004, LNAI 3245, pp. 16-31, 2004.
EESR—Extended European Search Report dated Feb. 27, 2025 for corresponding European Patent Application No. 22925944.5 [7 pages].

* cited by examiner

FIG. 2

Feature Amount Data Y (21)

| SAMPLE \ FEATURE AMOUNT | a | b | c | ... |
|---|---|---|---|---|
| 1 | 1.3 | 4.8 | 1 | ... |
| 2 | 2.1 | 3.7 | 0 | ... |
| 3 | 2.4 | 4.6 | 0 | ... |
| ... | ... | ... | ... | ... |

Binary Feature Amount Data X (22)

| SAMPLE \ ITEM | $x_1$ ($a<5$) | $x_2$ ($a\geq 2$) | $x_3$ ($c=0$) | ... |
|---|---|---|---|---|
| 1 | 1 | 0 | 0 | ... |
| 2 | 1 | 1 | 1 | ... |
| 3 | 1 | 1 | 1 | ... |
| ... | ... | ... | ... | ... |

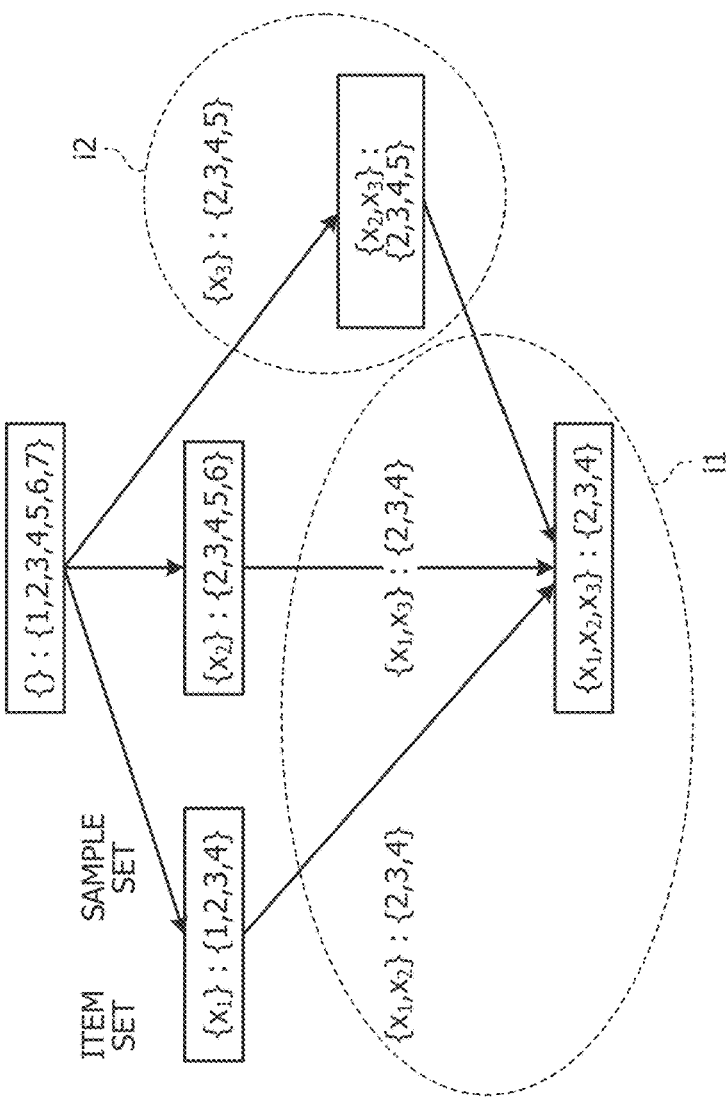

FIG. 4B

THRESHOLD VALUES UPDATED BY {}

| $Q^{\{\}}$ \ $P^{\{\}}$ | a | b | c | d |
|---|---|---|---|---|
| a |  | -0.4 | -0.4 | -0.4 |
| b | 0.9 |  | -0.4 | -0.7 |
| c | 0.4 | 0.4 |  | -0.4 |
| d | 0.4 | 0.4 | 0.5 |  |

CORRELATION COEFFICIENTS IN SAMPLE SET THAT SATISFIES CONDITION OF ITEM SET $\{x_1\}$

|  | a | b | c | d |
|---|---|---|---|---|
| a | 0.6 | 0.7 | 0.0 | 0.2 |
| b | 0.1 |  | -0.1 | -0.6 |
| c | 0.3 | -0.1 |  | 0.2 |
| d |  | -0.6 | 0.2 |  |

$\{x_1\}$ ... NOT ADOPTED

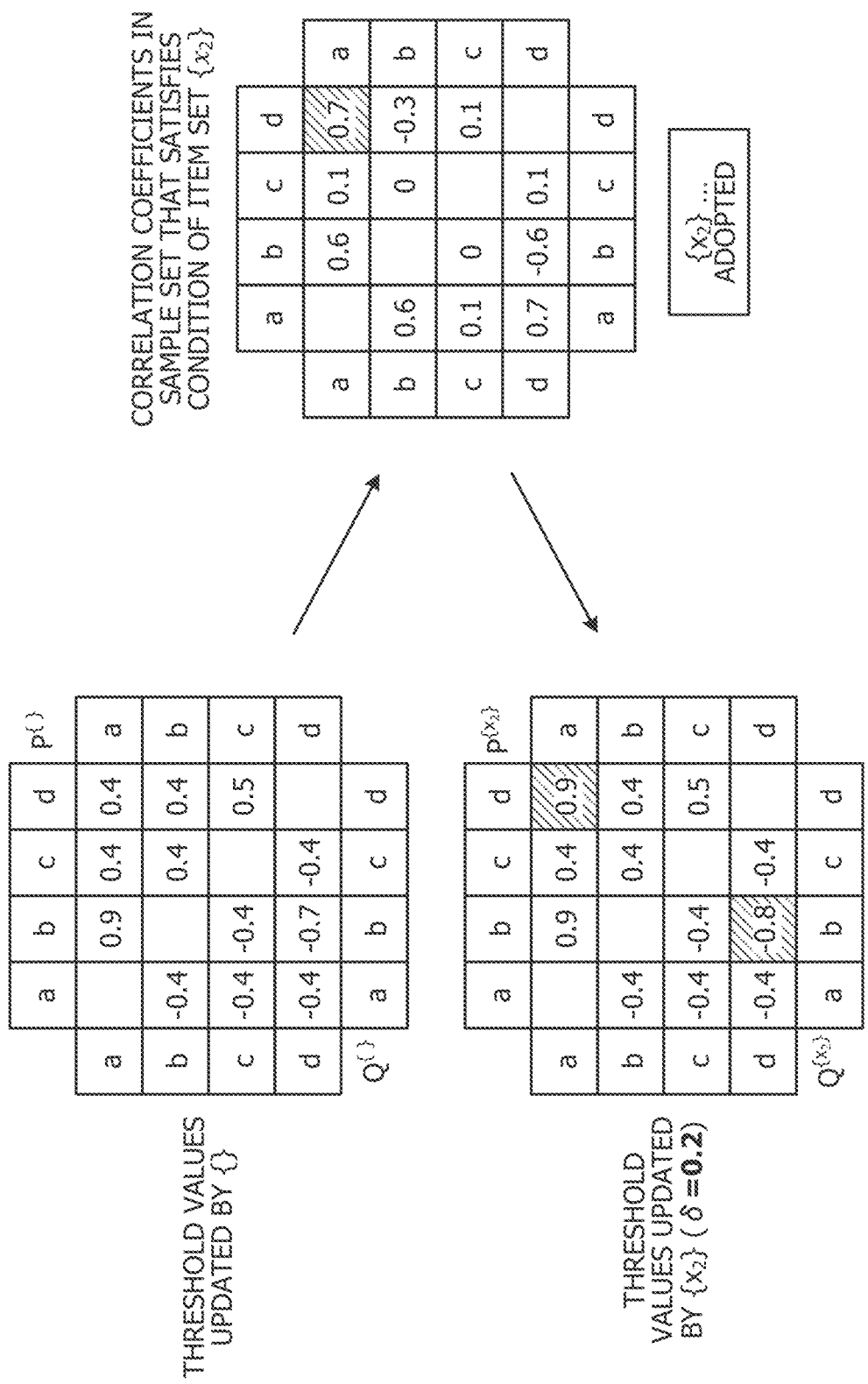

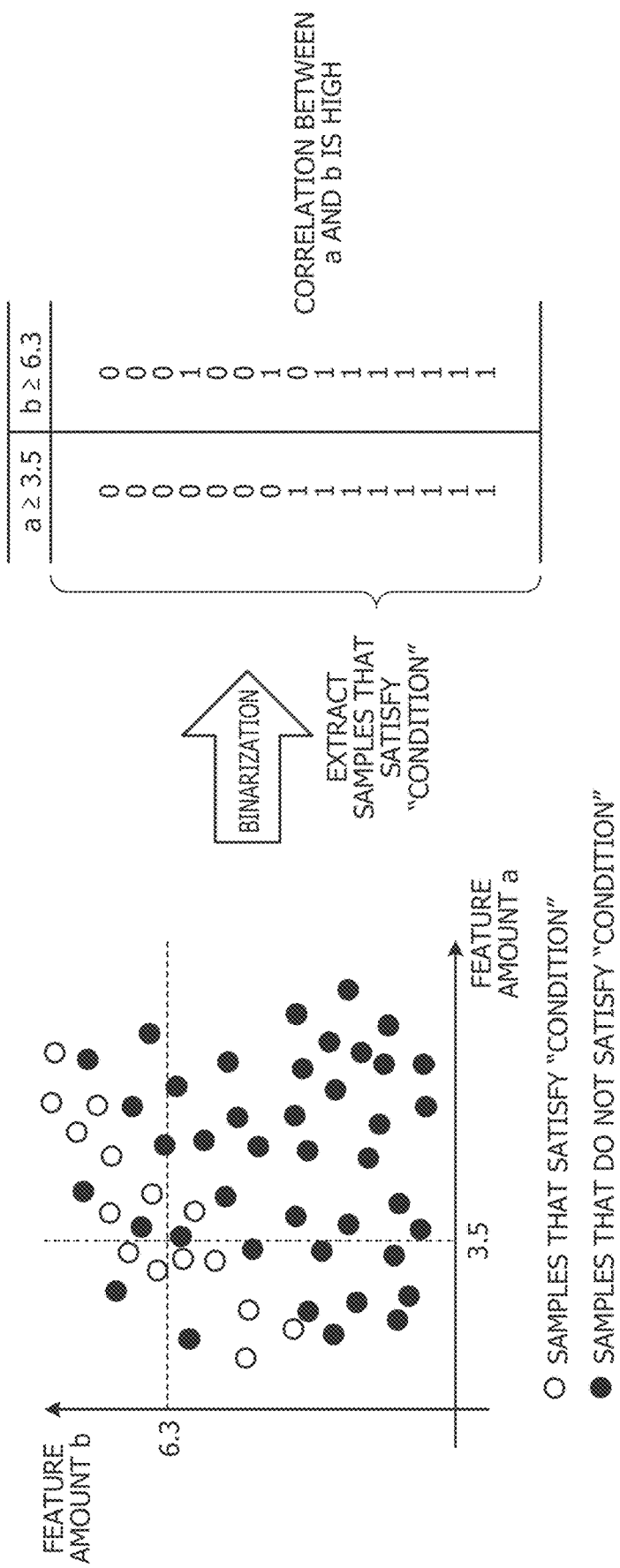

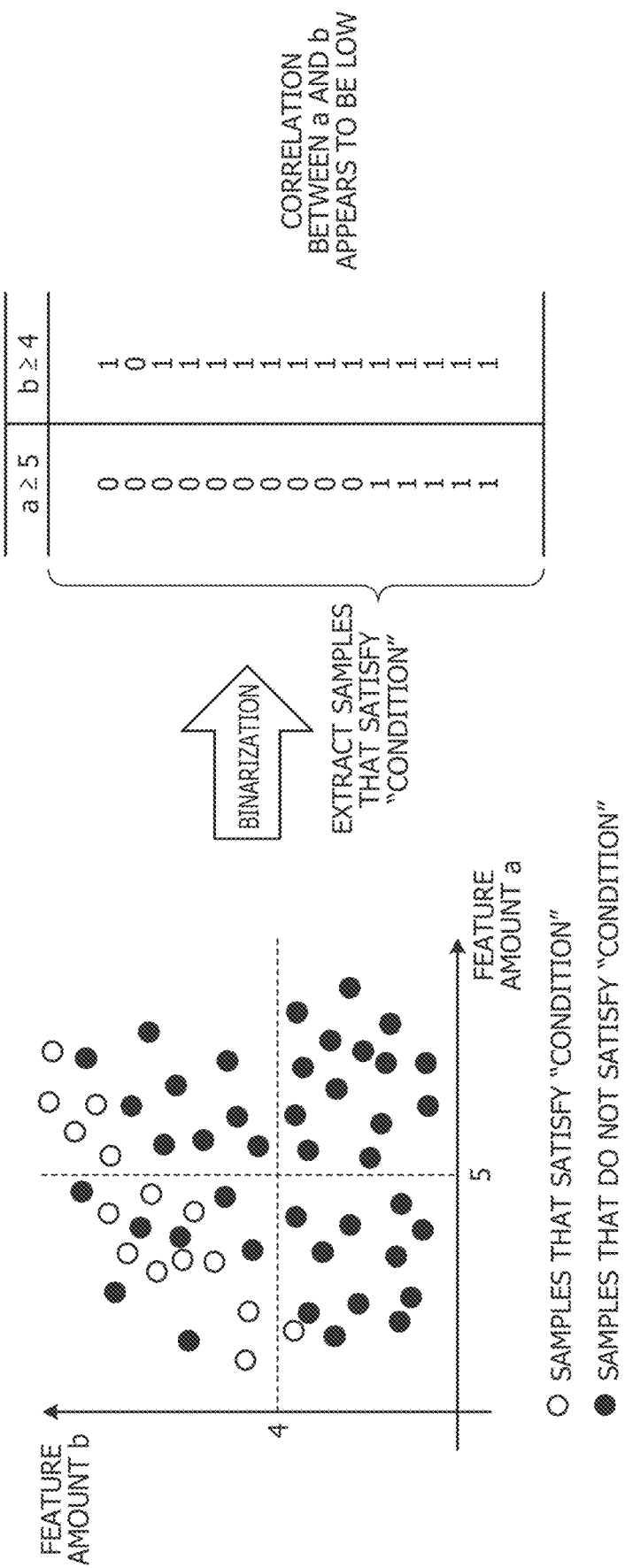

COMPUTER-READABLE RECORDING MEDIUM STORING INFORMATION PROCESSING PROGRAM, INFORMATION PROCESSING DEVICE, AND INFORMATION PROCESSING METHOD

CROSS-REFERENCE TO RELATED APPLICATION

This application is a continuation application of International Application PCT/JP2022/005497 filed on Feb. 10, 2022 and designated the U.S., the entire contents of which are incorporated herein by reference.

FIELD

The present embodiment relates to an information processing program and the like.

BACKGROUND

In recent years, research has been conducted to efficiently narrow down the number of conditions to be causally searched, by extracting correlated conditions. FIG. 8 is a reference diagram illustrating condition extraction for statistical causal search. As illustrated in FIG. 8, such a technique extracts all condition candidates for correlated data from past data for AI to train. Then, in the technique, all conditions for data having a causal relationship are extracted from the extracted condition candidates for the data. However, in the technique, while all condition candidates for the data are searched for a causal relationship, there is a problem that the search is unrealistic from a viewpoint of an amount of computation.

Related art is disclosed in Yusuke Koyanagi, four others, "Developing a Framework for Individual Causal Discovery and its Application to Real Marketing Data", The Japanese Society for Artificial Intelligence 18th Special Interest Group on Business Informatics, March 2021, URL: http://sig-bi.jp/doc/18thSIG-BI2021/18thSIG-BI2021paper13.pdf.

SUMMARY

According to an aspect of the embodiments, a non-transitory computer-readable recording medium stores an information processing program for causing a computer to execute processing including: generating, from first data in which values of a plurality of attributes included in each sample are accumulated for each sample, second data obtained by binarizing, for each sample, the values of the plurality of attributes included in each sample based on an attribute condition set in advance; enumerating, by using the second data, sets of attribute conditions in which all sample sets indicate true values; computing, for each set of attribute conditions, a correlation between the plurality of attributes in the first data in a sample set associated with each set of attribute conditions; and selecting a set of attribute conditions determined to have a correlation as a condition to be causally searched.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of generation processing according to the embodiment.

FIG. 3 is a diagram illustrating an example of enumeration processing according to the embodiment.

FIG. 4B is a diagram illustrating an example of the computation processing and the selection processing according to the embodiment.

FIG. 4C is a diagram illustrating an example of the computation processing and the selection processing according to the embodiment.

FIG. 10A is a diagram for describing a problem that a correlation for a pair of feature amounts changes depending on binarization threshold value setting.

FIG. 10B is a diagram for describing the problem that the correlation for the pair of feature amounts changes depending on the binarization threshold value setting.

DESCRIPTION OF EMBODIMENTS

Figure 9:
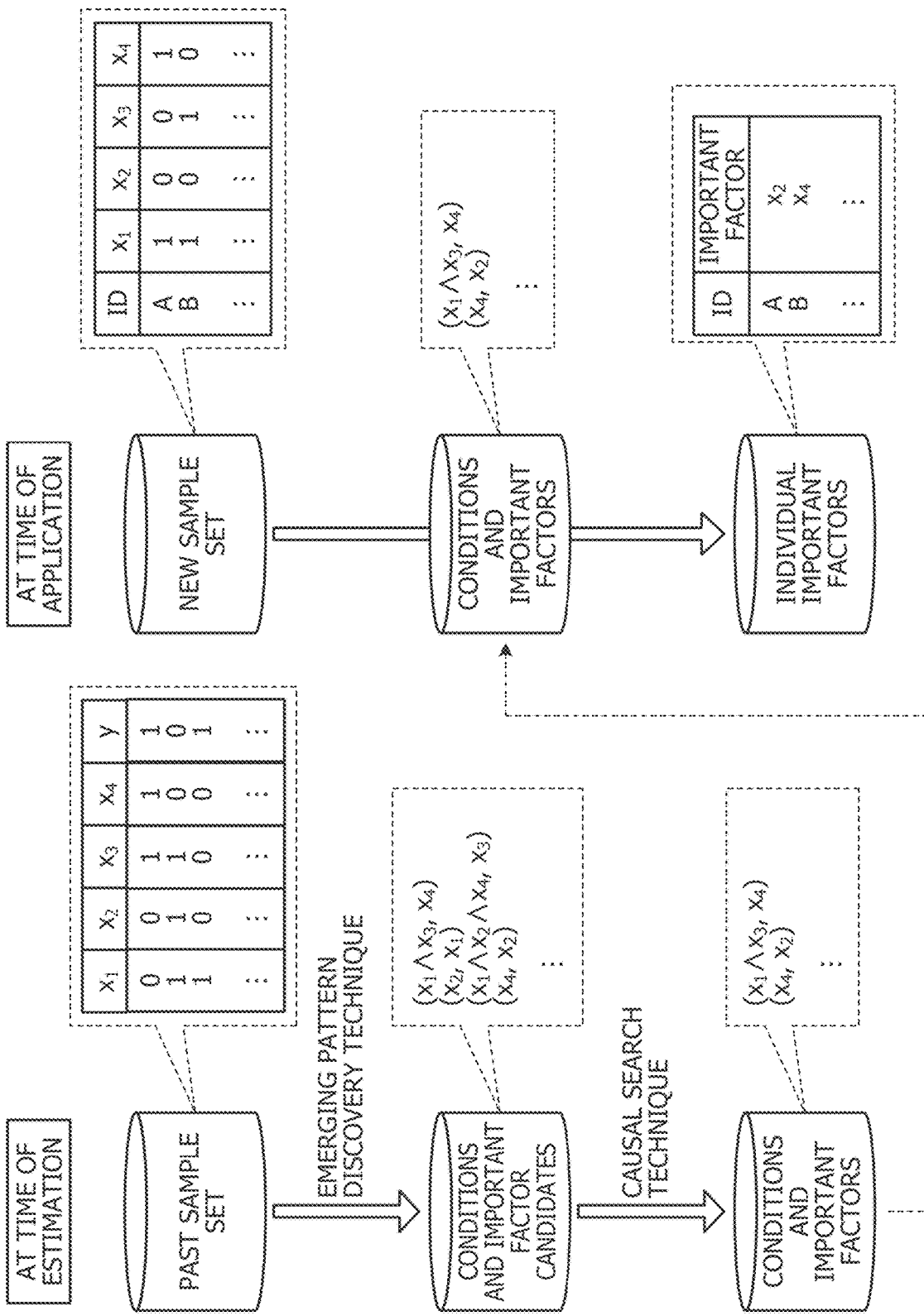
FIG. 9 is a reference diagram illustrating a technique for discovering individual characteristic causal relationships.

Thus, a technique that efficiently narrows down the number of conditions to be causally searched, by relaxing a condition search target to a correlation from the causal relationship has been disclosed (for example, Non-Patent Document). FIG. 9 is a reference diagram illustrating a technique for discovering individual characteristic causal relationships. As illustrated in FIG. 9, such a technique first uses an emerging pattern discovery technique to exhaustively find, from a past sample set, a combination of an important factor candidate that has a strong correlation with an objective variable under a specified condition, and a condition at that time. Note that the past sample set is used after being binarized based on a threshold value.

Thereafter, for each of the found conditions, a causal search technique is used to determine whether the important factor candidate under that condition is accurately an important factor. For example, a case where there is "$x1\hat{\ }x3\hat{\ }x4 \rightarrow y$" ($y=1$ when $x1=x3=x4=1$ is true) is assumed. In such a case, one variable selected from a left side is assigned as an "important factor candidate", and the rest is assigned as a "condition". Here, it is assumed that $x4$ indicates the "important factor candidate" and the remaining "$x1\hat{\ }x3$" indicates the "condition". In such a technique, when there is a high correlation between the "important factor candidate" and y on a right side in the past sample set that satisfies the "condition", that "condition" is adopted. The conditions and important factors found in this manner are held in a database (DB). Then, at the time of application, for samples whose causal relationships are desired to be known, the conditions that these samples satisfy are selected from the DB, and the corresponding important factors are presented.

However, there is a problem that, when a feature amount included in the past sample set is numerical value data, depending on binarization threshold value setting, a pair of feature amounts in which a high correlation appears under the "condition" may be detected or may not be detected. In other words, when the binarization threshold value setting changes, the correlation for the pair of feature amounts under the "condition" changes. Here, the problem that the correlation for the pair of feature amounts under the "condition" changes when the binarization threshold value setting changes will be described with reference to FIGS. 10A and 10B. FIGS. 10A and 10B are diagrams for describing the problem that the correlation for the pair of feature amounts changes depending on the binarization threshold value setting.

As illustrated in FIGS. 10A and 10B, in a left diagram, a graph obtained by plotting samples that satisfy the "condition" and samples that do not satisfy the "condition" focusing on a feature amount a and a feature amount b is represented. White circles are the samples that satisfy the "condition", and black circles are the samples that do not satisfy the "condition".

Under such a situation, in FIG. 10A, a threshold value of the feature amount a when the samples are binarized is set to 3.5, and a threshold value of the feature amount b when the samples are binarized is set to 6.3. Table data of a right diagram is obtained by binarizing the respective samples with these threshold values. In a case where samples that satisfy the "condition" are extracted from binarization, since a correlation between the feature amount a and the feature amount b is high, pairs of the feature amount a and the feature amount b in which a high correlation appears under the "condition" are detected. As a result, this "condition" is adopted as a condition under which a correlation appears.

On the other hand, in FIG. 10B, the threshold value of the feature amount a when the samples are binarized is set to 5, and the threshold value of the feature amount b when the samples are binarized is set to 4. Table data of a right diagram is obtained by binarizing the respective samples with these threshold values. In a case where samples that satisfy the "condition" are extracted from binarization, since a correlation between the feature amount a and the feature amount b appears to be low, a pair of the feature amount a and the feature amount b in which a high correlation appears under the "condition" is not detected. As a result, this "condition" is not adopted as a condition under which a correlation appears.

In this manner, when the feature amount included in the past sample set is the numerical value data, depending on the binarization threshold value setting, a pair of feature amounts in which a high correlation appears under the "condition" may be detected or may not be detected.

In one aspect, an object of the present invention is to accurately select a condition under which a correlation appears.

Hereinafter, an embodiment of an information processing program, an information processing device, and an information processing method disclosed in the present application will be described in detail with reference to the drawings. Note that the present invention is not limited by the embodiment.

Embodiment

[Functional Configuration of Information Processing Device]

Figure 1:
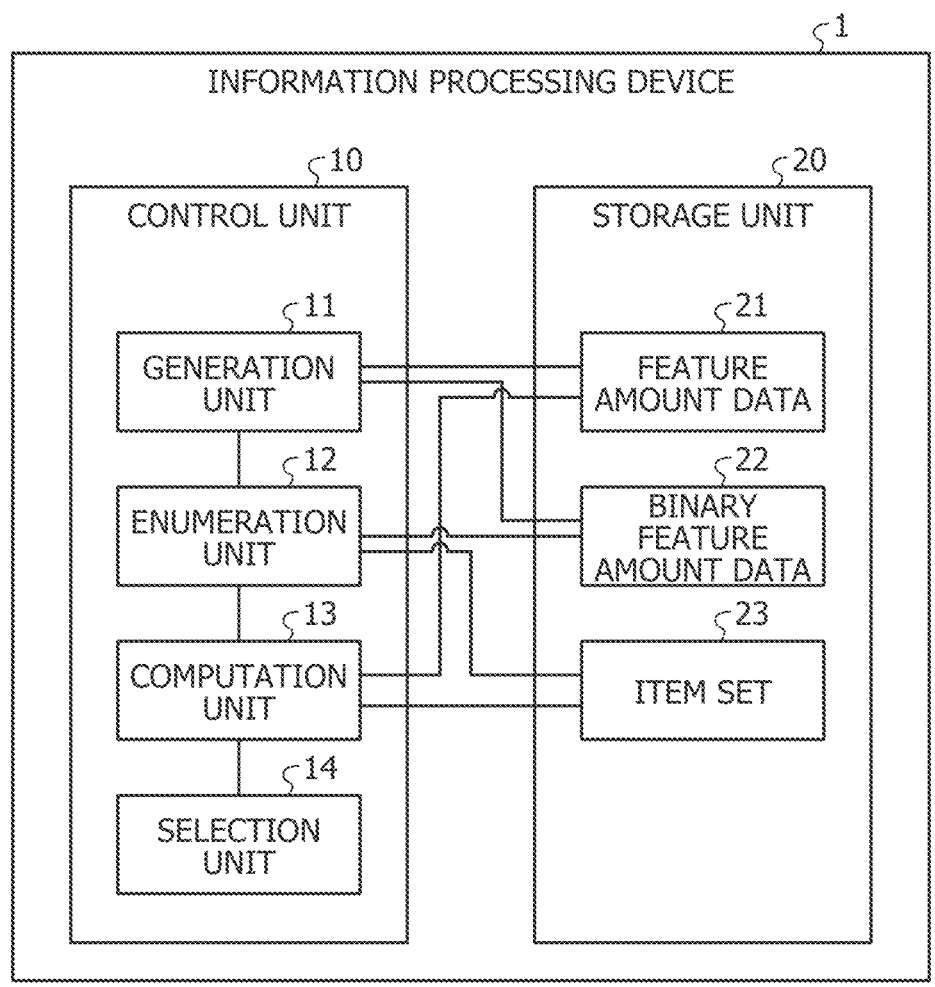
FIG. 1 is a functional block diagram illustrating a configuration of an information processing device according to an embodiment.

FIG. 1 is a functional block diagram illustrating a configuration of an information processing device according to an embodiment. An information processing device 1 illustrated in FIG. 1 generates, from first data in which values of a plurality of attributes included in each sample are accumulated, second data obtained by binarizing the values of the plurality of attributes included in each sample based on an item. Then, by using the second data, the information processing device 1 enumerates item sets in which all sample sets indicate true values. Then, the information processing device 1 computes a correlation coefficient of the plurality of attribute pairs in the first data in the sample set corresponding to each of the item sets. Then, the information processing device 1 selects an item set predicted to have a correlation as a condition to be causally searched.

As illustrated in FIG. 1, the information processing device 1 includes a control unit 10 and a storage unit 20. The control unit 10 includes a generation unit 11, an enumeration unit 12, a computation unit 13, and a selection unit 14.

The storage unit 20 stores various types of data. The storage unit 20 includes feature amount data 21, binary feature amount data 22, and an item set 23.

The feature amount data 21 is table data in which values of a plurality of feature amounts (attributes) included in each sample are accumulated. Each row of the feature amount data 21 corresponds to each sample. Each column of the feature amount data 21 corresponds to each feature amount (attribute).

The binary feature amount data 22 is table data obtained by binarizing values of a plurality of feature amounts (attributes) included in each sample from the feature amount data 21 based on a predetermined item. The binarization is performed by, for example, magnitude comparison between a value of an original feature amount and a constant. Each row of the binary feature amount data 22 corresponds to each sample that is the same as that of the feature amount data 21. Each column of the binary feature amount data 22 corresponds to each binary feature amount. The binary feature amount corresponds to each item for binarizing each feature amount. For example, in a case where the feature amount is a, an item indicating the binary feature amount indicates a condition of magnitude comparison between a and a constant for binarizing the feature amount.

The item set 23 is groups of item sets enumerated using the binary feature amount data 22, and is groups of item sets corresponding to sample sets that are true with the same binary feature amount (item). The individual item sets included in the item set 23 needs to be frequently appearing item sets. The frequently appearing item set refers to an item set having the number of samples of a certain size or more. The reason why the item set 23 is the frequently appearing item set is that the number of samples having a certain size or more is needed for statistical causal search.

Furthermore, the individual item sets included in the item set 23 is preferably represented by a saturated item set. The saturated item set refers to a union of groups of item sets having the same sample set. For example, in a case where a sample set {1, 2, 3} has an item set {x3} and also has an item set {x2, x3}, a saturated item set indicating {x2, x3} which is a union of groups of item sets is put as a representative in the item set 23. The reason why the item set 23 is the saturated item set is that it is useless to associate a plurality of item sets with the same sample set. Note that the item set 23 is generated by the enumeration unit 12.

The generation unit 11 generates the binary feature amount data 22 from the feature amount data 21. For example, the generation unit 11 generates, from the feature amount data 21, the binary feature amount data 22 obtained by binarizing values of the respective feature amounts into true and false based on binary feature amounts (items). Then, the generation unit 11 stores the generated binary feature amount data 22 in the storage unit 20.

The enumeration unit 12 enumerate, by using the binary feature amount data 22, frequently appearing saturated item sets in which all sample sets indicate true values. For example, by using the binary feature amount data 22, the enumeration unit 12 extracts correspondence information in which all sample sets indicate true values are associated with each item set. Each item set is a frequently appearing item set having the number of samples of a certain size or more. Additionally, each item set is a saturated item set that is a union of groups of item sets having the same sample set. That is, each item set is the frequently appearing saturated item set. Then, the enumeration unit 12 stores a group of frequently appearing saturated item sets in the storage unit 20 as the item set 23.

Furthermore, the enumeration unit 12 generates a directed acyclic graph having an empty set as a starting point for the enumerated frequently appearing saturated item sets. In the directed acyclic graph, items are added from upstream toward downstream. Note that the frequently appearing saturated item sets may be enumerated using, for example, an algorithm of enumeration of the frequently appearing saturated item sets of "Takeaki Uno, Tatsuya Asai, Yuzo Uchida, Hiroki Arimura, *"An Efficient Algorithm for Enumerating Closed Patterns in Transaction Databases"*, *Discovery Science* 2004, *LNAI* 3245, pp. 16-31".

The computation unit 13 computes a correlation between a plurality of feature amounts in the feature amount data 21 in a sample set associated with each frequently appearing saturated item set. For example, the computation unit 13 selects a frequently appearing saturated item set in order from an empty set of a directed acyclic graph toward downstream. The computation unit 13 computes a correlation coefficient of each feature amount pair in the feature amount data 21 in a sample set that satisfies conditions of all items included in the selected frequently appearing saturated item set. As an example, the computation unit 13 extracts, from the feature amount data 21, a value of a feature amount of each sample set associated with the selected frequently appearing saturated item set. Then, the computation unit 13 computes a correlation coefficient of each feature amount pair using the extracted value of the feature amount.

The selection unit 14 selects a frequently appearing saturated item set predicted to have a correlation as a condition to be causally searched. For example, in a case where there are a certain number or more of feature amount pairs having a correlation coefficient equal to or larger than a threshold value set for the selected frequently appearing saturated item set, the selection unit 14 determines that there is a correlation and selects the selected frequently appearing saturated item set as a condition. The certain number may be "1" or "2", and it is sufficient the certain number is set in advance.

Note that the threshold value is set for each feature amount pair. Then, the threshold value is updated such that there is a feature amount pair whose correlation increases by a certain amount or more due to addition of an item from upstream to downstream. Furthermore, the threshold value may be updated such that a set of feature amount pairs whose correlation increases by a certain amount or more due to addition of an item is different from others.

[Example of Generation Processing]

Here, generation processing performed by the generation unit 11 according to the embodiment will be described with reference to FIG. 2. FIG. 2 is a diagram illustrating an example of the generation processing according to the embodiment. As illustrated in FIG. 2, in a left diagram, feature amount data Y is represented as the feature amount data 21. In the feature amount data Y, a, b, c, . . . are set as feature amounts, and value of the feature amounts are set for each sample.

The generation unit 11 generates the binary feature amount data 22 from such feature amount data Y. In other words, the generation unit 11 generates, from the feature amount data Y, the binary feature amount data 22 obtained by binarizing the values of the respective feature amounts into true and false based on binary feature amounts (items) set in advance. In a right diagram, binary feature amount data X is represented as the binary feature amount data 22. In the binary feature amount data X, $x_1$, $x_2$, $x_3$, . . . are set as the binary feature amounts (items), and "1" and "0" are set for the respective samples. The $x_1$ as the item indicates a condition that the feature amount a is smaller than 5. The $x_2$ as the item indicates a condition that the feature amount a is larger than 2. The $x_3$ indicates a condition that the feature amount c is 0. Then, for each of the $x_1$, $x_2$, and $x_3$, "1" is set in a case where the condition is satisfied, and "0" is set in a case where the condition is not satisfied.

As an example, in a case where the sample is "1", for the item $x_1$ (a<5), "1" is set because the feature amount a is "1.3" and the feature amount a is smaller than "5". For the item $x_2$ (a≥2), "0" is set because the feature amount a is "1.3" and the feature amount a is smaller than "2". For the item $x_3$ (c=0), "0" is set because the feature amount c is "1" and the feature amount c is not "0".

[Example of Enumeration Processing]

Next, enumeration processing performed by the enumeration unit 12 according to the embodiment will be described with reference to FIG. 3. FIG. 3 is a diagram illustrating an example of the enumeration processing according to the embodiment. As illustrated in FIG. 3, in a left diagram, the binary feature amount data X is represented as the binary feature amount data 22.

By using such binary feature amount data X, the enumeration unit 12 extracts item sets in which all sample sets indicate true values. Here, it is assumed that the extracted item set has the number of three or more samples. The enumeration unit 12 extracts the following item sets. An empty set { } in a case where the sample set is {1, 2, 3, 4, 5, 6, 7} is extracted. $\{x_1\}$ in a case where the sample set is {1, 2, 3, 4} is extracted. $\{x_2\}$ in a case where the sample set is {2, 3, 4, 5, 6} is extracted. $\{x_2, x_3\}$ in a case where the sample set is {2, 3, 4, 5} is extracted. $\{x_1, x_2\}$ in a case where the sample set is {2, 3, 4} is extracted. $\{x_1, x_3\}$ in a case where the sample set is {2, 3, 4} is extracted. $\{x_1, x_2, x_3\}$ in a case where the sample set is {2, 3, 4} is extracted.

Then, the enumeration unit 12 enumerates frequently appearing saturated item sets from the extracted item sets. Here, since the item sets $\{x_1, x_2\}$, $\{x_1, x_3\}$, and $\{x_1, x_2, x_3\}$ indicated by a reference sign i1 have the same sample set {2, 3, 4}, the $\{x_1, x_2, x_3\}$ is exemplified as the frequently appearing saturated item set. Furthermore, since the item sets $\{x_3\}$ and $\{x_2, x_3\}$ indicated by a reference sign i2 have the same sample set {2, 3, 4, 5}, the $\{x_2, x_3\}$ is exemplified as the frequently appearing saturated item set. Note that the empty set { }, the {x₁}, and the {x₂} are similarly exemplified as the frequently appearing saturated item sets.

Then, the enumeration unit 12 generates a directed acyclic graph having the empty set as a starting point for the enumerated frequently appearing saturated item sets. In a right diagram, the directed acyclic graph for these frequently appearing saturated item sets is represented.

[Example of Computation Processing and Selection Processing]

Figure 4A:
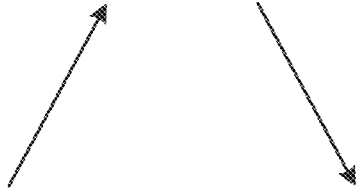
FIG. 4A is a diagram illustrating an example of computation processing and selection processing according to the embodiment.

Next, computation processing and selection processing performed by the computation unit 13 and the selection unit 14 according to the embodiment will be described with reference to FIGS. 4A to 4C. FIGS. 4A to 4C are diagrams illustrating an example of the computation processing and the selection processing according to the embodiment. Note that, in FIGS. 4A to 4C, a correlation coefficient of each feature amount pair in the feature amount data 21 for feature amounts a, b, c, and d is computed.

As illustrated in FIG. 4A, in an upper left diagram, initial values of a positive correlation threshold value and a negative correlation threshold value of each feature amount pair for the feature amounts a, b, c, and d are set. Here, an initial value of a positive correlation threshold value θ indicates 0.4. An initial value of a negative correlation threshold value θ indicates −0.4.

Under such a situation, the computation unit 13 selects an item set indicating a starting point from a directed acyclic graph for frequently appearing saturated item sets. Then, the computation unit 13 computes a correlation coefficient of each feature amount pair in the feature amount data 21 in a sample set that satisfies a condition of an empty set { } that is the selected item set. The sample set that satisfies the condition of the empty set { } mentioned here means the entire samples. Here, the correlation coefficient of each feature amount pair in a case where the item set is the empty set { } is represented in a right diagram. In the correlation coefficient of each feature amount pair in the right diagram, a positive correlation coefficient of a pair of the feature amounts a and b is 0.7, which is larger than the threshold value 0.4. Furthermore, a negative correlation coefficient of a pair of the feature amounts d and b is −0.5, which is smaller than the threshold value −0.4.

Thus, since there is the feature amount pair having the correlation coefficient equal to or larger than the set threshold value for the positive correlation, the selection unit 14 adopts (selects) the empty set { } that is the selected item set as a condition. Furthermore, since there is also the feature amount pair having the correlation coefficient equal to or smaller than the set threshold value from the negative correlation, the selection unit 14 may adopt (select) the empty set { } that is the selected item set as a condition.

Then, the selection unit 14 updates the threshold value used downstream of the empty set { } that is the item set. In other words, the selection unit 14 updates the threshold value in order to find, as a condition, an item set better than the item set already adopted (selected) as the condition. The updated threshold value is represented in a lower left diagram. Here, a feature amount pair having a high correlation in a case where the item set is the empty set { } is the pair of feature amounts a and b. Therefore, the positive correlation threshold value of the pair of feature amounts a and b is updated so as to increase by a certain amount δ (=0.2). In other words, the positive correlation threshold value of the pair of feature amounts a and b is updated to 0.9. That is, such a threshold value is updated such that there is a feature amount pair whose correlation increases by the certain amount δ (=0.2) or more due to addition of an item from the empty set { } to downstream. Furthermore, a feature amount pair having a high correlation in a case where the item set is the empty set { } is the pair of feature amounts d and b. Therefore, the negative correlation threshold value of the pair of feature amounts d and b is updated so as to decrease by the certain amount δ (=0.2). In other words, the negative correlation threshold value of the pair of feature amounts d and b is updated to −0.7. That is, such a threshold value is updated such that there is a feature amount pair whose correlation increases by the certain amount δ (=0.2) or more due to addition of an item from the empty set { } to downstream. Note that, here, the positive correlation coefficient of a pair of the feature amounts c and d is 0.3, which is lower than the threshold value 0.4, but a positive correlation threshold value of the pair of feature amounts c and d is updated so as to increase by the certain amount δ (=0.2) in order to find a better item set. In other words, the positive correlation threshold value of the pair of feature amounts c and d is updated to 0.5. That is, such a threshold value is updated such that a set of feature amount pairs whose correlation increases by the certain amount or more due to addition of an item from the empty set { } to downstream is different from others.

As illustrated in FIG. 4B, in a left diagram, the threshold values updated from the empty set { } to downstream are set. Here, the positive correlation threshold value of the pair of feature amounts a and b is updated to 0.9. The negative correlation threshold value of the pair of feature amounts d and b is updated to −0.7. Furthermore, the positive correlation threshold value of the pair of feature amounts c and d is updated to 0.5.

Under such a situation, the computation unit 13 selects the next item set from the directed acyclic graph for the frequently appearing saturated item sets. Here, it is assumed that {x₁} is selected as an item set downstream of the empty set { }. Then, the computation unit 13 computes a correlation coefficient of each feature amount pair in the feature amount data 21 in a sample set that satisfies a condition of the selected item set {x₁}. For example, the correlation coefficient of each feature amount pair in a case where the item set is {x₁} is represented in a right diagram. In the correlation coefficient of each feature amount pair in the right diagram, the positive correlation coefficients of all the feature amount pairs are lower than the threshold values updated from the empty set { } to downstream. The negative correlation coefficients of all the feature amount pairs are higher than the threshold values updated from the empty set { } to downstream.

Thus, the selection unit 14 does not adopt (select) the item set {x₁} as a condition. That is, the sample set that satisfies the item set {x₁} is a subset of a sample set that satisfies the empty set { }, which is a similar sample set, and there is no feature amount pair in which a correlation increases by the certain amount δ or more. Therefore, the item set {x₁} is not adopted (selected) as a condition.

As illustrated in FIG. 4C, in an upper left diagram, the threshold values updated from the empty set { } to downstream are set. The updated threshold values are the same as those indicated in the left diagram of FIG. 4B. In other words, the positive correlation threshold value of the pair of feature amounts a and b is updated to 0.9. The negative correlation threshold value of the pair of feature amounts d and b is updated to −0.7. Furthermore, the positive correlation threshold value of the pair of feature amounts c and d is updated to 0.5.

Under such a situation, the computation unit 13 selects the next item set from the directed acyclic graph for the frequently appearing saturated item sets. Here, it is assumed that $\{x_2\}$ is selected as an item set downstream of the empty set $\{\ \}$. Then, the computation unit 13 computes a correlation coefficient of each feature amount pair in the feature amount data 21 in a sample set that satisfies a condition of the selected item set $\{x_2\}$. For example, the correlation coefficient of each feature amount pair in a case where the item set is $\{x_2\}$ is represented in a right diagram. In the correlation coefficient of each feature amount pair in the right diagram, a positive correlation coefficient of a pair of the feature amounts a and d is 0.7, which is larger than the threshold value 0.4.

Thus, since there is the feature amount pair having the correlation coefficient equal to or larger than the set threshold value for the positive correlation, the selection unit 14 adopts (selects) the selected item set $\{x_2\}$ as a condition.

Then, the selection unit 14 updates the threshold value used downstream of the item set $\{x_2\}$. In other words, the selection unit 14 updates the threshold value in order to find, as a condition, an item set better than the item set already adopted (selected) as the condition. The updated threshold value is represented in a lower left diagram. Here, a feature amount pair having a high correlation in a case where the item set is $\{x_2\}$ is the pair of feature amounts a and d. Therefore, the positive correlation threshold value of the pair of feature amounts a and d is updated so as to increase by the certain amount $\delta$ (=0.2). In other words, the positive correlation threshold value of the pair of feature amounts a and d is updated to 0.9. That is, such a threshold value is updated such that there is a feature amount pair whose correlation increases by the certain amount or more due to addition of an item from upstream to downstream. Additionally, threshold values of the other feature amount pairs indicate the threshold values updated by the empty set $\{\ \}$ indicated in the upper left diagram. Note that, here, the negative correlation coefficient of the pair of feature amounts d and b is −0.6, which is lower than the threshold value −0.7, but the negative correlation threshold value of the pair of feature amounts d and b is updated so as to decrease by the certain amount $\delta$ (=0.2) in order to find a better item set. In other words, the negative correlation threshold value of the pair of feature amounts d and b is updated to −0.8. That is, such a threshold value is updated such that a set of feature amount pairs whose correlation increases by the certain amount or more due to addition of an item from upstream to downstream is different from others.

[Flowchart of Information Processing]

Figure 5:
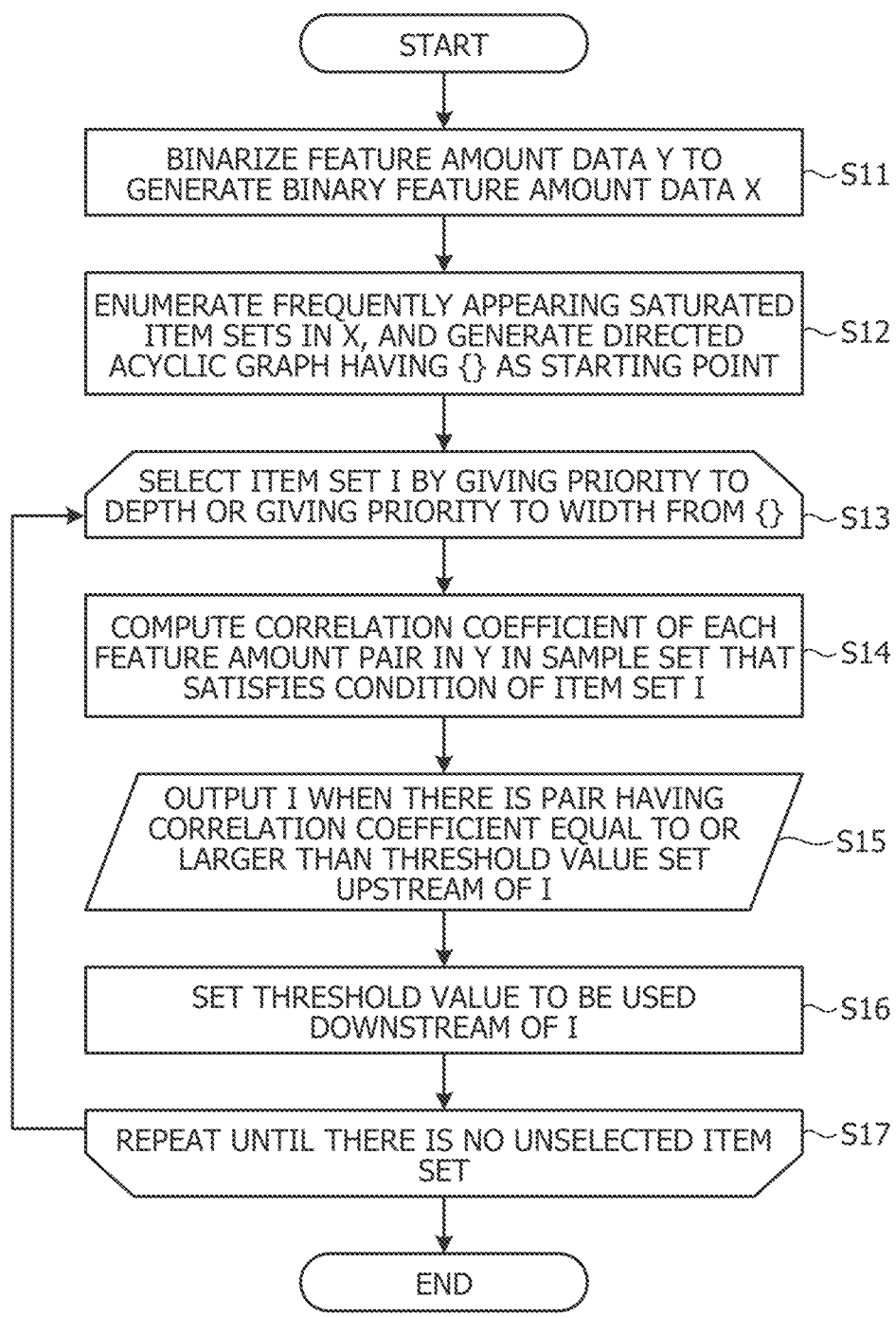
FIG. 5 is a diagram illustrating an example of a flowchart of information processing according to the embodiment.

FIG. 5 is a diagram illustrating an example of a flowchart of information processing according to the embodiment.

As illustrated in FIG. 5, the generation unit 11 binarizes the feature amount data Y to generate the binary feature amount data X (step S11).

Then, the enumeration unit 12 enumerates frequently appearing saturated item sets in the binary feature amount data X, and generates a directed acyclic graph having an empty set $\{\ \}$ as a starting point for the enumerated frequently appearing saturated item sets (step S12).

Then, the computation unit 13 selects a frequently appearing saturated item set I by giving priority to depth or giving priority to width from the empty set $\{\ \}$ (step S13). The computation unit 13 computes a correlation coefficient of each feature amount pair in the feature amount data Y in a sample set that satisfies a condition of the frequently appearing saturated item set I (step S14).

Then, when there is a feature amount pair having a correlation coefficient equal to or larger than a threshold value set upstream of the frequently appearing saturated item set I, the selection unit 14 selects and outputs the selected frequently appearing saturated item set I as a condition (step S15). Note that, in a case where the frequently appearing saturated item set I is the empty set at the starting point, the threshold value used in the frequently appearing saturated item set I is assumed to be set in advance.

Then, the selection unit 14 sets a threshold value to be used downstream of the selected frequently appearing saturated item set I (step S16). For example, the selection unit 14 updates a threshold value of a feature amount pair having a correlation equal to or greater than the threshold value, so as to increase the threshold value by a certain amount or more. Furthermore, the selection unit 14 may update a threshold value of a feature amount pair different from the feature amount pair having the correlation equal to or greater than the threshold value, so as to increase the threshold value by a certain amount or more.

Then, the computation unit 13 proceeds to step S13 so as to repeat until there is no unselected frequently appearing saturated item set (step S17). Then, when there is no unselected frequently appearing saturated item set, the computation unit 13 ends the information processing.

In this manner, the information processing according to the embodiment may accurately select a condition under which a correlation appears.

Figure 6:
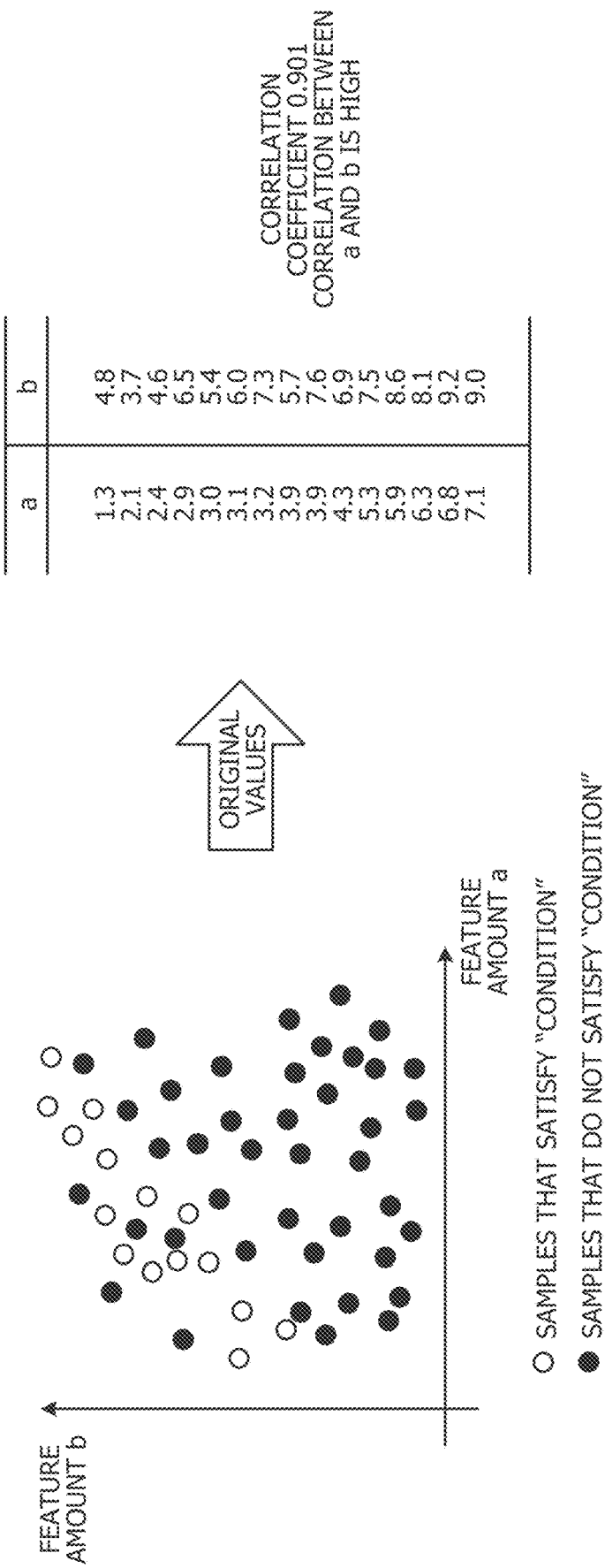
FIG. 6 is a diagram illustrating an effect of the information processing according to the embodiment.

FIG. 6 is a diagram illustrating an effect of the information processing according to the embodiment. In a left diagram, a graph obtained by plotting samples that satisfy the "condition" and samples that do not satisfy the "condition" focusing on a feature amount a and a feature amount b is represented. White circles are the samples that satisfy the "condition", and black circles are the samples that do not satisfy the "condition". In the information processing according to the embodiment, a pair of feature amounts is evaluated not from information binarized by threshold value setting but from information indicating values of original feature amounts. Therefore, a pair of feature amounts in which a high correlation appears under the "condition" is not overlooked. Therefore, the information processing according to the embodiment may accurately select the "condition" under which a correlation appears based on a correlation coefficient between feature amounts computed from values of original feature amounts.

Effects of Embodiment

According to the embodiment described above, the information processing device 1 generates, from the feature amount data 21 in which values of a plurality of feature amounts included in each sample are accumulated for each sample, the binary feature amount data 22 obtained by binarizing, for each sample, the values of the plurality of feature amounts included in each sample based on an item set in advance. By using the binary feature amount data 22, the information processing device 1 enumerates item sets in which all sample sets indicate true values. Then, for each item set, the information processing device 1 computes a correlation between a plurality of feature amounts in the feature amount data 21 in a sample set associated with each item set. Then, the information processing device 1 selects an item set determined to have a correlation as a condition to be causally searched. As a result, the information processing device 1 may accurately select a condition under which a correlation appears.

Furthermore, according to the embodiment described above, the information processing device 1 enumerates item sets indicating a union of groups of item sets having the same sample set. As a result, the information processing device 1 may suppress extraction of a plurality of item sets having the same sample set.

Furthermore, according to the embodiment described above, the information processing device 1 further enumerates item sets for a sample set in which the number of samples included in the sample set is equal to or larger than a predetermined number. As a result, the information processing device 1 may increase accuracy of selecting a condition as the number of samples included in the sample set is equal to or larger than the predetermined number.

Furthermore, according to the embodiment described above, the information processing device 1 selects an item set in order, and computes a correlation coefficient of a plurality of pairs of feature amounts in the feature amount data 21 in a sample set associated with the selected item set. In a case where there is a pair of feature amounts having a correlation coefficient equal to or larger than a predetermined threshold value, the information processing device 1 selects the selected item set as a condition. As a result, the information processing device 1 may avoid overlooking a pair of feature amounts in which a high correlation appears under the condition by using, for evaluation of the correlation coefficient, values of original feature amounts in the sample set.

Furthermore, according to the embodiment described above, the information processing device 1 generates a directed acyclic graph having an item set as an empty set as a starting point by using the enumerated item sets. The information processing device 1 selects an item set in order by giving priority to depth or giving priority to width from the empty set included in the directed acyclic graph, and computes a correlation coefficient related to the selected item set. Then, in a case where there is a pair of feature amounts having a correlation coefficient equal to or larger than a threshold value set at a higher level of the selected item set, the information processing device 1 selects the selected item set as a condition. As a result, the information processing device 1 may select a better item set as a condition by using the threshold value set at the higher level.

Note that each illustrated component of the information processing device 1 does not necessarily have to be physically configured as illustrated in the drawings. In other words, specific forms of distribution and integration of the information processing device 1 are not limited to the illustrated ones, and the whole or a part of the information processing device 1 may be configured by being functionally or physically distributed and integrated in optional units according to various loads, use situations, or the like. For example, the computation unit 13 and the selection unit 14 may be integrated. Furthermore, the storage unit 20 may be coupled through a network as an external device of the information processing device 1.

Figure 7:
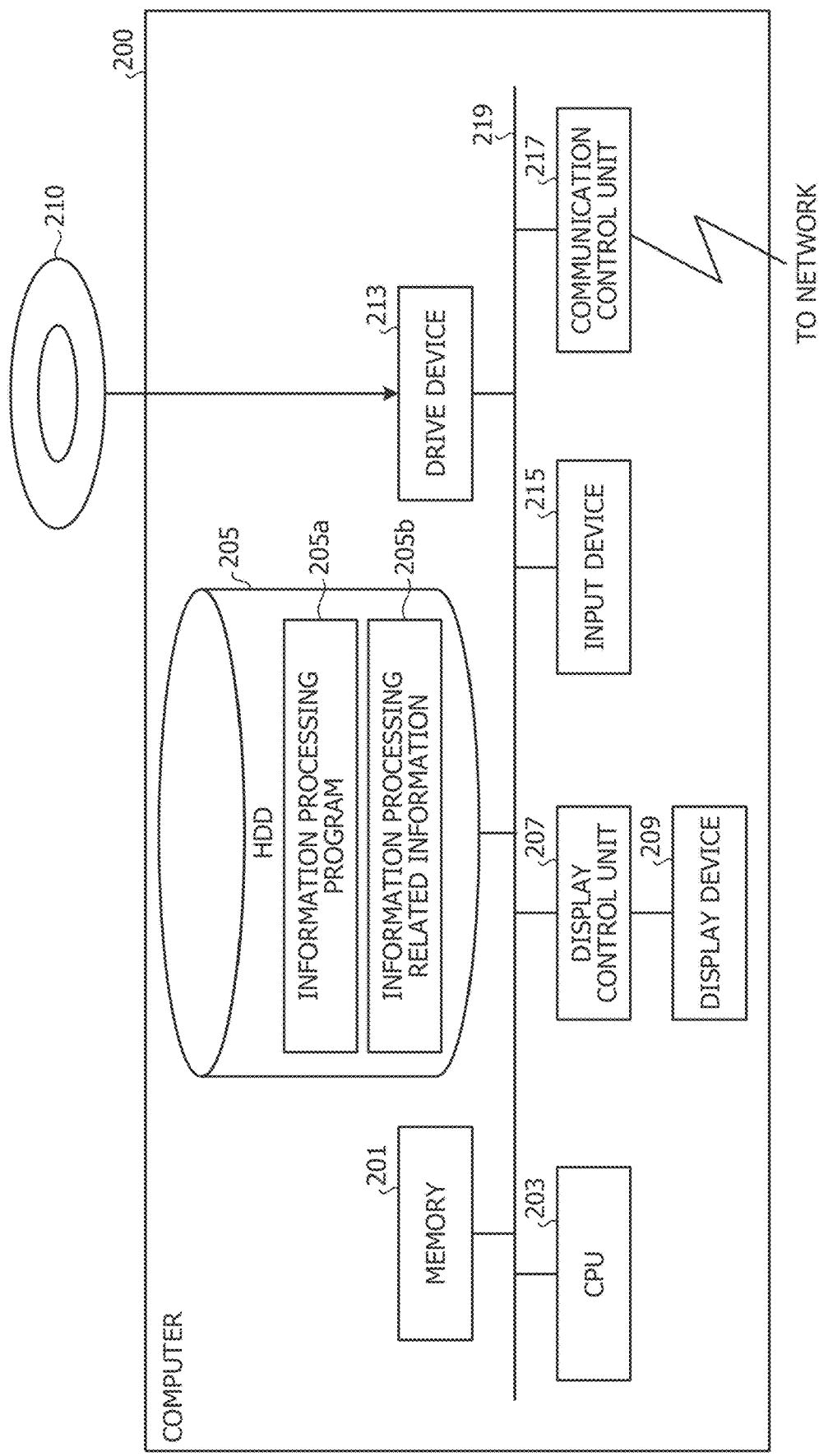
FIG. 7 is a diagram illustrating an example of a computer that executes an information processing program.
Figure 8:
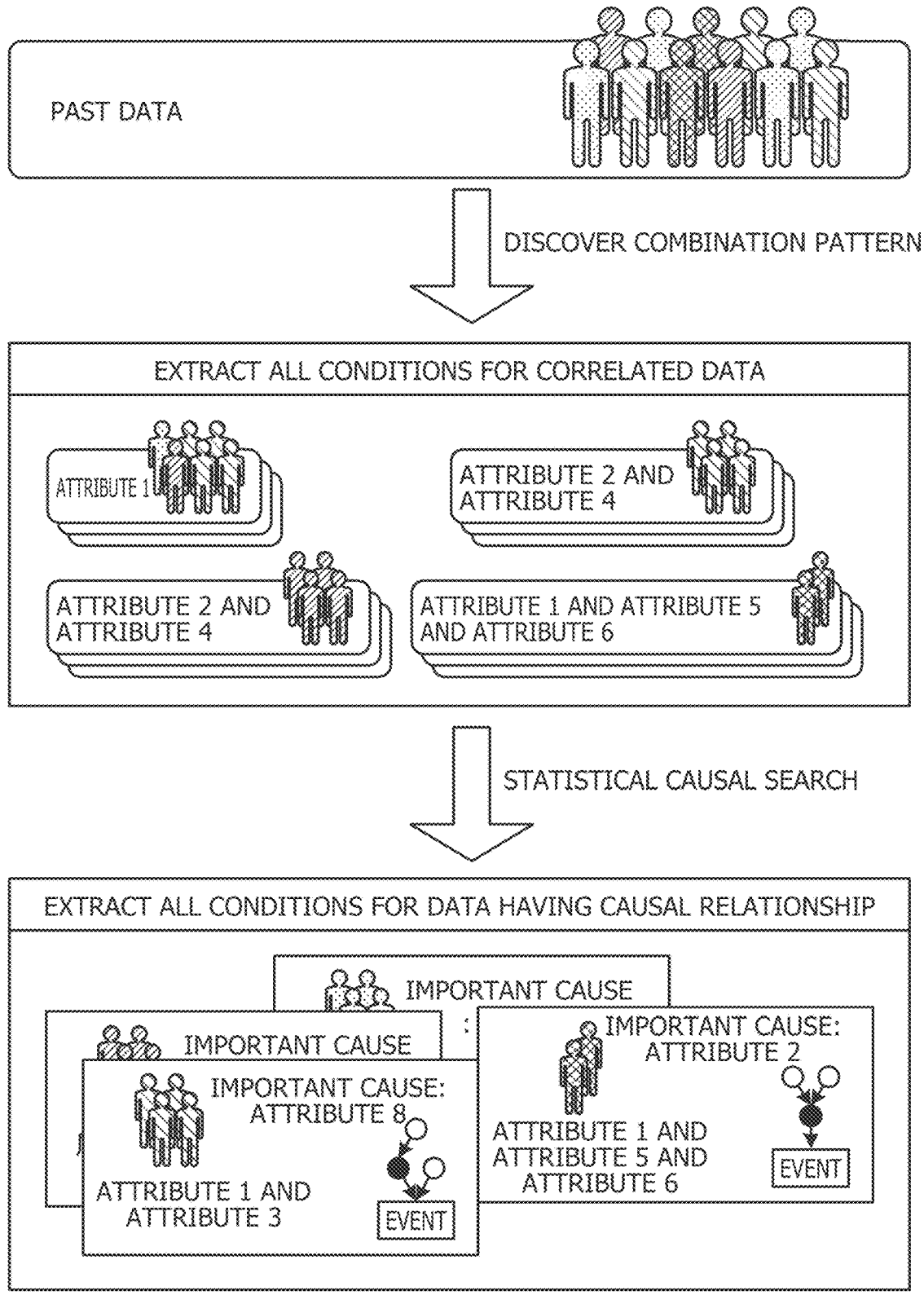
FIG. 8 is a reference diagram illustrating condition extraction for statistical causal search.

Furthermore, various types of processing described in the embodiment described above may be implemented by a computer such as a personal computer or a workstation executing programs prepared in advance. Thus, in the following, an example of a computer that executes an information processing program that implements functions similar to the functions of the information processing device 1 illustrated in FIG. 1 will be described. Here, the information processing program that implements the functions similar to the functions of the information processing device 1 will be described as an example. FIG. 7 is a diagram illustrating an example of the computer that executes the information processing program.

As illustrated in FIG. 7, a computer 200 includes a CPU 203 that executes various types of computation processing, an input device 215 that accepts data input from a user, and a display control unit 207 that controls a display device 209. Furthermore, the computer 200 includes a drive device 213 that reads a program and the like from a storage medium, and a communication control unit 217 that exchanges data with another computer via a network. Furthermore, the computer 200 includes a memory 201 that temporarily stores various types of information, and a hard disk drive (HDD) 205. Additionally, the memory 201, the CPU 203, the HDD 205, the display control unit 207, the drive device 213, the input device 215, and the communication control unit 217 are coupled by a bus 219.

The drive device 213 is, for example, a device for a removable disk 210. The HDD 205 stores an information processing program 205a and information processing related information 205b.

The CPU 203 reads the information processing program 205a, loads the information processing program 205a into the memory 201, and executes the information processing program 205a as a process. Such a process corresponds to each functional unit of the information processing device 1. The information processing related information 205b corresponds to the feature amount data 21, the binary feature amount data 22, and the item set 23. Additionally, for example, the removable disk 210 stores each piece of information such as the information processing program 205a.

Note that the information processing program 205a does not necessarily have to be stored in the HDD 205 from the beginning. For example, the program is stored in a "portable physical medium" to be inserted into the computer 200, such as a flexible disk (FD), a compact disk read only memory (CD-ROM), a digital versatile disk (DVD), a magneto-optical disk, or an integrated circuit (IC) card. Then, the computer 200 may read the information processing program 205a from these media to execute the information processing program 205a.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an information processing program for causing a computer to execute processing comprising:
generating, from first data in which values of a plurality of attributes included in each sample are accumulated for each sample, second data obtained by binarizing, for each sample, the values of the plurality of attributes included in each sample based on an attribute condition set in advance;
enumerating, by using the second data, sets of attribute conditions in which all sample sets indicate true values;
generating a directed acyclic graph that has the set of attribute conditions as an empty set as a starting point by using the enumerated sets of attribute conditions;

selecting the set of attribute conditions in order by giving priority to depth or giving priority to width from the empty set included in the directed acyclic graph;

computing, for each set of attribute conditions, a correlation coefficient between a plurality of pairs of the plurality of attributes in the first data in a sample set associated with each of the selected set of attribute conditions; and in a case where there is a pair of attributes that has a correlation coefficient equal to or larger than a threshold value set at a higher level of the selected set of attribute conditions, selecting the selected set of attribute conditions as a condition to be causally searched.

2. The information processing program according to claim 1, wherein, in the processing of enumerating the sets of attribute conditions, the sets of attribute conditions that indicate a union of groups of sets of attribute conditions that have the same sample set are enumerated.

3. The non-transitory computer-readable recording medium according to claim 2, wherein, in the processing of enumerating the sets of attribute conditions, the sets of attribute conditions are further enumerated for a sample set in which the number of samples included in the sample set is equal to or larger than a predetermined number.

4. An information processing device comprising:

a memory; and a processor coupled to the memory and configured to:

generate, from first data in which values of a plurality of attributes included in each sample are accumulated for each sample, second data obtained by binarizing, for each sample, the values of the plurality of attributes included in each sample based on an attribute condition set in advance;

enumerate, by using the second data, sets of attribute conditions in which all sample sets indicate true values;

generate a directed acyclic graph that has the set of attribute conditions as an empty set as a starting point by using the enumerated sets of attribute conditions;

select the set of attribute conditions in order by giving priority to depth or giving priority to width from the empty set included in the directed acyclic graph;

compute, for each set of attribute conditions, a correlation coefficient between a plurality of pairs of the plurality of attributes in the first data in a sample set associated with each of the selected set of attribute conditions; and in a case where there is a pair of attributes that has a correlation coefficient equal to or larger than a threshold value set at a higher level of the selected set of attribute conditions, select the selected set of attribute conditions as a condition to be causally searched.

5. An information processing method for causing a computer to execute processing comprising:

generating, from first data in which values of a plurality of attributes included in each sample are accumulated for each sample, second data obtained by binarizing, for each sample, the values of the plurality of attributes included in each sample based on an attribute condition set in advance;

enumerating, by using the second data, sets of attribute conditions in which all sample sets indicate true values;

generating a directed acyclic graph that has the set of attribute conditions as an empty set as a starting point by using the enumerated sets of attribute conditions;

selecting the set of attribute conditions in order by giving priority to depth or giving priority to width from the empty set included in the directed acyclic graph;

computing, for each set of attribute conditions, a correlation coefficient between a plurality of pairs of the plurality of attributes in the first data in a sample set associated with each of the selected set of attribute conditions; and in a case where there is a pair of attributes that has a correlation coefficient equal to or larger than a threshold value set at a higher level of the selected set of attribute conditions, selecting the selected set of attribute conditions as a condition to be causally searched.

\* \* \* \* \*